US010331969B2

(12) United States Patent
Charpentier et al.

(10) Patent No.: US 10,331,969 B2
(45) Date of Patent: Jun. 25, 2019

(54) IMAGE PROCESSING FOR SCALE ZERO VALIDATION

(71) Applicant: NCR Corporation, Duluth, GA (US)

(72) Inventors: Peter R. Charpentier, Suwanee, GA (US); Jason Rambler, Decatur, GA (US)

(73) Assignee: NCR Corporation, Atlanta, GA (US)

( * ) Notice: Subject to any disclaimer, the term of this patent is extended or adjusted under 35 U.S.C. 154(b) by 174 days.

(21) Appl. No.: 15/337,510

(22) Filed: Oct. 28, 2016

(65) Prior Publication Data
US 2018/0121751 A1    May 3, 2018

(51) Int. Cl.
G06K 9/46     (2006.01)
G07G 1/00     (2006.01)
G06Q 20/20    (2012.01)

(52) U.S. Cl.
CPC ......... G06K 9/4671 (2013.01); G06Q 20/208 (2013.01); G07G 1/0054 (2013.01)

(58) Field of Classification Search
CPC .... G06Q 20/208; G06Q 20/20; G06Q 20/202; G06Q 20/18; G06Q 20/201; G06Q 20/203; G06Q 20/204; G06Q 20/206; G07G 1/0054; G07G 1/0063; G07G 1/0072; G07G 1/0045; G06K 2209/17; G06K 9/78; G06K 9/4671; A47F 9/046; A47F 9/047; A47F 9/04; G06F 3/04842; G06F 3/0488; G06F 3/04886

See application file for complete search history.

(56) References Cited

U.S. PATENT DOCUMENTS

| 5,306,875 | A | * | 4/1994 | Schmitzek | G01G 23/3707 177/145 |
| 6,080,938 | A | * | 6/2000 | Lutz | G01G 23/166 177/25.15 |
| 6,296,185 | B1 | * | 10/2001 | Dejaeger | A47F 9/046 235/383 |
| 6,408,279 | B1 | * | 6/2002 | Mason | A47F 9/047 235/383 |
| 6,794,586 | B1 | * | 9/2004 | Mason | G01G 19/4144 177/185 |
| 7,448,542 | B1 | * | 11/2008 | Bobbitt | G06Q 20/208 186/61 |

(Continued)

Primary Examiner — Michael S Osinski
(74) Attorney, Agent, or Firm — Schwegman, Lundberg & Woessner

(57) ABSTRACT

Various embodiments herein each include at least one of systems, devices, software, and methods that leverage images captured by imaging devices of product barcode scanners, which may include scanner-scale devices, and other imaging devices deployed at a Point of Sale (POS) terminal. One such embodiment, in the form of a method, includes identifying a scale-zero error condition and determining, based on a view of a scale surface provided by at least one imaging device, whether an item is present on the scale surface. In such embodiments, when no item is present on the scale surface, the method includes providing an instruction via an output device for proceeding with a scale zeroing process. Further in such embodiments, when an item is present on the scale surface, the method includes providing an instruction via the output device to remove the item present on the scale surface and restarting the method.

7 Claims, 4 Drawing Sheets

(56) References Cited

U.S. PATENT DOCUMENTS

| | | | | |
|---|---|---|---|---|
| 7,612,302 B2* | 11/2009 | Tamkin | G01G 19/4144 | 177/25.15 |
| 7,909,248 B1* | 3/2011 | Goncalves | G07G 1/0063 | 235/375 |
| 8,927,882 B2* | 1/2015 | Teraoka | G01G 19/4144 | 177/25.13 |
| 9,811,816 B2* | 11/2017 | Sato | G06Q 20/208 | |
| 9,990,619 B2* | 6/2018 | Miyakoshi | G06Q 20/208 | |
| 10,169,752 B2* | 1/2019 | Katsumura | G06Q 20/208 | |
| 2003/0010825 A1* | 1/2003 | Schmidt | A47F 9/04 | 235/462.14 |
| 2003/0018897 A1* | 1/2003 | Bellis, Jr. | G06Q 20/341 | 713/182 |
| 2003/0120547 A1* | 6/2003 | Walter | A47F 9/046 | 705/16 |
| 2004/0041021 A1* | 3/2004 | Nugent, Jr. | A47F 9/047 | 235/383 |
| 2004/0262391 A1* | 12/2004 | Harris | G06Q 20/20 | 235/454 |
| 2008/0061139 A1* | 3/2008 | Roquemore | G01G 19/4144 | 235/383 |
| 2009/0072028 A1* | 3/2009 | Teraoka | G06Q 30/06 | 235/383 |
| 2009/0219153 A1* | 9/2009 | Ohkawa | G06Q 20/208 | 340/540 |
| 2010/0139989 A1* | 6/2010 | Atwater | G01G 19/4144 | 177/245 |
| 2011/0172943 A1* | 7/2011 | Roberts | G01G 23/166 | 702/87 |
| 2012/0193407 A1* | 8/2012 | Barten | A47F 9/046 | 235/375 |
| 2012/0193416 A1* | 8/2012 | Smith | G06K 7/10554 | 235/440 |
| 2012/0205433 A1* | 8/2012 | Dudek | G07G 1/01 | 235/375 |
| 2013/0054397 A1* | 2/2013 | Nakatake | G07G 1/0063 | 705/23 |
| 2013/0175099 A1* | 7/2013 | Tazawa | G07G 1/0072 | 177/25.13 |
| 2013/0182899 A1* | 7/2013 | Naito | G06K 9/6201 | 382/103 |
| 2014/0064569 A1* | 3/2014 | Sugasawa | G06K 9/00671 | 382/110 |
| 2014/0175164 A1* | 6/2014 | Allard | G06Q 30/06 | 235/375 |
| 2014/0249950 A1* | 9/2014 | Fukuda | G07G 1/0018 | 705/23 |
| 2015/0082857 A1* | 3/2015 | Reed | G01G 23/01 | 73/1.13 |
| 2015/0193668 A1* | 7/2015 | Fukuda | G06Q 20/208 | 705/23 |
| 2015/0194025 A1* | 7/2015 | Tsunoda | G07G 1/0036 | 348/150 |
| 2015/0242833 A1* | 8/2015 | Itani | G07G 1/01 | 705/23 |
| 2016/0086148 A1* | 3/2016 | Katsumura | G06Q 20/208 | 705/23 |
| 2016/0086149 A1* | 3/2016 | Yuyama | G06Q 20/208 | 705/23 |
| 2016/0123794 A1* | 5/2016 | Toohey | G01G 23/166 | 177/1 |
| 2016/0217449 A1* | 7/2016 | Takeno | G06Q 20/208 | |
| 2016/0292661 A1* | 10/2016 | Kwan | H04N 7/181 | |
| 2017/0083884 A1* | 3/2017 | Vilmosh | G06Q 20/18 | |
| 2017/0206517 A1* | 7/2017 | Kwan | G06Q 20/208 | |
| 2018/0045557 A1* | 2/2018 | Cleper | G01G 19/387 | |
| 2018/0096332 A1* | 4/2018 | O'Herlihy | G07G 1/0063 | |
| 2018/0218350 A1* | 8/2018 | Crooks | G06K 1/121 | |
| 2018/0225534 A1* | 8/2018 | Sawada | G07G 1/0036 | |

\* cited by examiner

IMAGE PROCESSING FOR SCALE ZERO VALIDATION

BACKGROUND INFORMATION

The scale of a point of sale (POS) terminal barcode scanner has to be very responsive and accurate at the same time. One of the key considerations for a scale is maintaining a true zero weight before weighing. This true zero can be corrupted if someone presses the scale zero reset button while there is an item on the top plate. That action would create a false state of zero.

This can be an issue especially in self-checkout where the user can be confused when weighing multiple items. Even though the self-checkout provides verbal helps, the customer may not be sure on next steps, and language issues and the rush of shopping can add to the confusion. A consumer can inadvertently press scale zero without a clean or empty top plate.

Assisted lane cashiers are also faced with this problem when they are novice, or just in a hurry. The cashier may inadvertently press scale zero when there are items still on the top plate. There is also a potential for theft if the cashier is trying to remove weight for malicious reasons. For example, selling weighed items to friends or family at a lower value by first removing weight on purpose using the above process.

SUMMARY

Various embodiments herein each include at least one of systems, devices, software, and methods that leverage images captured by imaging devices of product scanners, which may include scanner-scale devices, and other imaging devices deployed at a Point of Sale (POS) terminal.

One such embodiment, in the form of a method, includes identifying a scale-zero error condition and determining, based on a view of a scale surface provided by at least one imaging device, whether an item is present on the scale surface. In such embodiments, when no item is present on the scale surface, the method includes providing an instruction via an output device for proceeding with a scale zeroing process. Further in such embodiments, when an item is present on the scale surface, the method includes providing an instruction via the output device to remove the item present on the scale surface and restarting the method.

Another method embodiment includes determining whether an item is present on a scale surface based on a view of the scale surface provided by an imaging device. In these embodiments, when an item is present on the scale surface, the method includes outputting an instruction via an output device to remove the item present on the scale surface.

A further embodiment is a device that includes at least one output device, an input, at least one processor, and a memory device. The memory device stores instructions executable by the at least one processor to perform data processing activities. The data processing activities may include determining whether an item is present on a scale surface based on a view of the scale surface received from the input and when an item is present on the scale surface, outputting an instruction via at least one output device to remove the item present on the scale surface.

DETAILED DESCRIPTION

Figure 1:
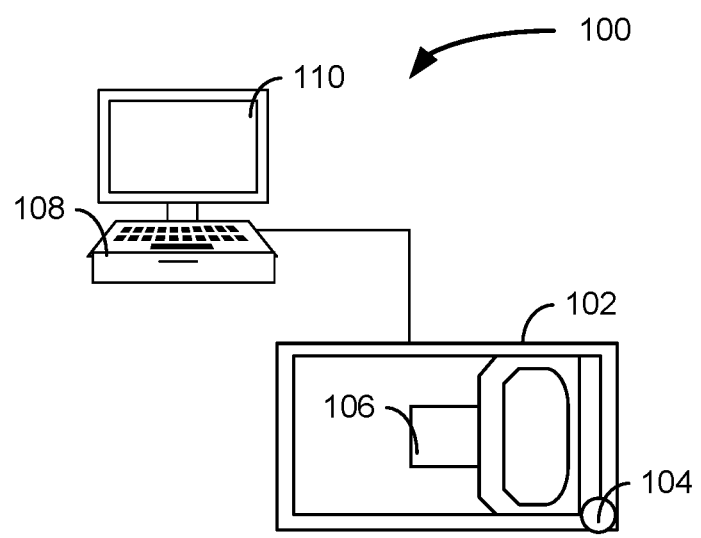
FIG. 1 is logical block diagram of an example checkout terminal upon which image processing for scale zero validation may be performed, according an example embodiment.

Various embodiments herein each include at least one of systems, devices, software, and methods that leverage images captured by imaging devices of product scanners, which may include barcode scanner devices, barcode scanner-scale devices, and other imaging devices deployed at a Point of Sale (POS) terminal. Such POS terminals may be cashier assisted terminals, self-service terminals (SSTs), and the like. These embodiments process these images to help customers utilizing SST POS terminals and cashiers at cashier assisted terminals to provide a true scale zero upon occurrence of a desire to zero a scale or upon detection of a scale zero fault condition for which a scale zero reset is called for. When a scale zero reset is to be performed, some embodiments include presenting a view of an image of what is on the scale along with instructions to remove all items and then to press a zero button of the scale.

In one such embodiment, a customer may be weighing multiple items on a SST POS terminal. If the scale is in need of an intervention and scale zero button press, such as upon detection of a scale zero fault condition, the customer can be directed to do so. However, the customer may not always understand what to do. In this case, the customer may attempt to reset the scale zero but may not know to first clear all items from the scale first. A proper zero may then not be set and customer may be frustrated and discouraged from utilizing an SST POS terminal in the future. Such embodiments operate to not only instruct the customer what to do but also to provide an image of the scale and explain exactly what to remove through one or more of graphical, textual, and audible instructions. Note that in some embodiments, the scale may be a scale of a barcode scanner/scale device, but the scale may also be a stand-alone scale.

In some cashier assisted POS terminal embodiment, a cashier may be pressing a zero on a scale when items are still on the top plate. By leveraging images captured by one or more imaging devices of the scale when the scale is a barcode scanner/scale or other imaging device and seeing what is on the scale, the embodiment may alert the cashier and provide an image of the items remaining on the top plate. This image-based knowledge may also prevent a user from pressing the scale zero button when any items are on the top plate if they try to proceed after the alert.

One or more images of the various embodiments herein may therefore be utilized to identify whether items are present on a scale, such as on a top plate of a scale, and to assist in instructing a user to remove the items. These and other embodiments are described herein with reference to the figures.

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims.

The functions or algorithms described herein are implemented in hardware, software or a combination of software and hardware in one embodiment. The software comprises computer executable instructions stored on computer readable media such as memory or other type of storage devices. Further, described functions may correspond to modules, which may be software, hardware, firmware, or any combination thereof. Multiple functions are performed in one or more modules as desired, and the embodiments described are merely examples. The software is executed on a digital signal processor, ASIC, microprocessor, or other type of processor operating on a system, such as a personal computer, server, a router, or other device capable of processing data including network interconnection devices.

Some embodiments implement the functions in two or more specific interconnected hardware modules or devices with related control and data signals communicated between and through the modules, or as portions of an application-specific integrated circuit. Thus, the exemplary process flow is applicable to software, firmware, and hardware implementations.

FIG. 1 is logical block diagram of an example checkout terminal 100 upon which image processing for scale zero validation may be performed, according an example embodiment. The checkout terminal 100, which may also be referred to as a POS terminal, is illustrated as a cashier assisted checkout terminal, although other checkout terminal types are equally relevant, such as SST POS terminals.

The checkout terminal 100 includes a scanner/scale 102 that has a scale zero button and one or more imaging devices (e.g., electronic cameras) that may be deployed at one or more locations 106. The checkout terminal 100 further includes a computing device 108 and a display 110. Some embodiments may further include one or more other cameras deployed at other locations, handheld scanning devices, audio and visual output devices, a keyboard, other input devices, and other elements.

In operation, the scanner/scale 102 weighs items placed on a top plate 107. The scale of the scanner/scale 102 is a sensitive device and its weighing accuracy is typically subject to regulation. As such, the scanner/scale 102, the computer 108, or other computing element may monitor operation of the scanner/scale 102 to help ensure accurate weights are measured, a proper scale zero setting is maintained, when zeroed that too much weight is not zeroed off, and other possible scale error conditions.

To zero the scale of the scanner/scale 102, a scale zero button 104 may need to be pressed. However, a zeroing process, as may be triggered by pressing the scale zero button 104, may instead be triggered programmatically.

In operation, when a scale zero button 104 press is received or a scale zero process is triggered, such as upon detection of a scale error event, one or more of the various method illustrated and described herein may be triggered for execution on a processor of one or both of the scanner/scale 102 and the computer 108. In such embodiments, images are captured by one or more imaging devices. The images are captured of the entirety or a portion of the top plate 107 of the scanner/scale 102. The images are then processed to determine whether any items are present on top plate 107. If not, the scale may be zeroed by pressing the scale zero button 104 in response to an instruction output via the display 110, a speaker, and the like. Upon the button press or a triggering of a scale zeroing process, the scale zero is set. However, if an item is determined to be present on the top plate 107, such as by subtracting a reference image from a captured image and considering remaining values at all or select image pixels, one or more instructions to remove the item on the top plate 107 may be output via the display 110, a speaker, and other output devices.

Figure 2:
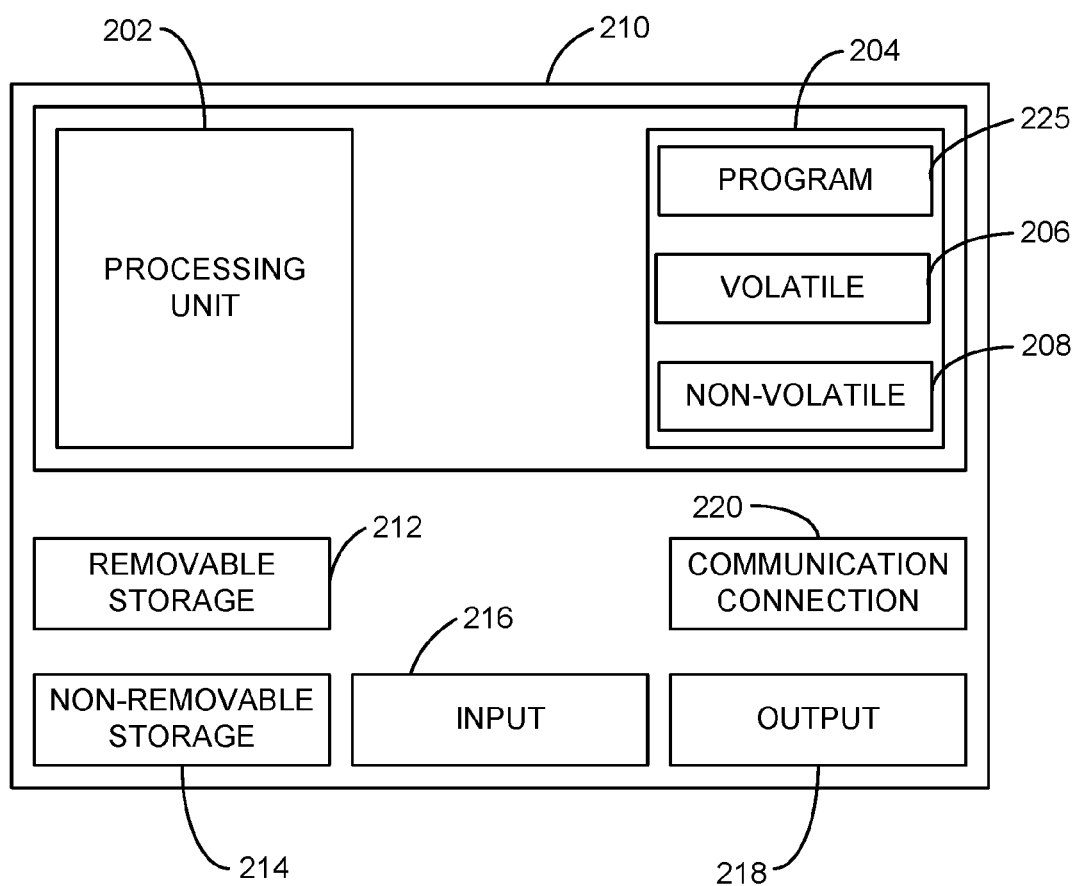
FIG. 2 is a block diagram of a computing device, according to an example embodiment.

FIG. 2 is a block diagram of a computing device, according to an example embodiment. In one embodiment, multiple such computer systems are utilized in a distributed network to implement multiple components in a transaction-based environment. An object-oriented, service-oriented, or other architecture may be used to implement such functions and communicate between the multiple systems and components.

One example computing device in the form of a computer 210 that may be deployed as the computer 108 of FIG. 1. The computer 210 may include a processing unit 202, memory 204, removable storage 212, and non-removable storage 214. Although the example computing device is illustrated and described as computer 210, the computing device may be in different forms in different embodiments. For example, the computing device may instead be a smartphone, a tablet, smartwatch, or other computing device including the same or similar elements as illustrated and described with regard to FIG. 2. Devices such as smartphones, tablets, and smartwatches are generally collectively referred to as mobile devices. Further, although the various data storage elements are illustrated as part of the computer 210, the storage may also or alternatively include cloud-based storage accessible via a network, such as the Internet.

Returning to the computer 210, memory 204 may include volatile memory 206 and non-volatile memory 208. Computer 210 may include—or have access to a computing environment that includes a variety of computer-readable media, such as volatile memory 206 and non-volatile memory 208, removable storage 212 and non-removable storage 214. Computer storage includes random access memory (RAM), read only memory (ROM), erasable programmable read-only memory (EPROM) and electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 210 may include or have access to a computing environment that includes input 216, output 218, and a communication connection 220. The input 216 may include one or more of a touchscreen, touchpad, mouse, keyboard, camera, one or more device-specific buttons, one or more sensors integrated within or coupled via wired or wireless data connections to the computer 210, and other input devices. The computer 210 may operate in a networked environment using a communication connection 220 to connect to one or more remote computers, such as database servers, web servers, and other computing device. An example remote computer may include a personal computer (PC), server, router, network PC, a peer device or other common network node, or the like. The communication connection 220 may be a network interface device such as one or both of an Ethernet card and a wireless card or circuit that may be connected to a network. The network may include one or more of a Local Area Network (LAN), a Wide Area Network (WAN), the Internet, and other networks. In some embodiments, the communication connection 220 may also or alternatively include a transceiver device, such as a BLUETOOTH® device that enables the computer 210 to wirelessly receive data from and transmit data to other BLUETOOTH® devices.

Another example computing device is a controller of a scale or a scanner/scale, such as the scanner/scale 102 of FIG. 1.

Computer-readable instructions stored on a computer-readable medium are executable by the processing unit 202 of the computer 210. A hard drive (magnetic disk or solid state), CD-ROM, and RAM are some examples of articles including a non-transitory computer-readable medium. For example, various computer programs 225 or apps, such as one or more applications and modules implementing one or more of the methods illustrated and described herein or an app or application that executes on a mobile device or is accessible via a web browser, may be stored on a non-transitory computer-readable medium.

Figure 3:
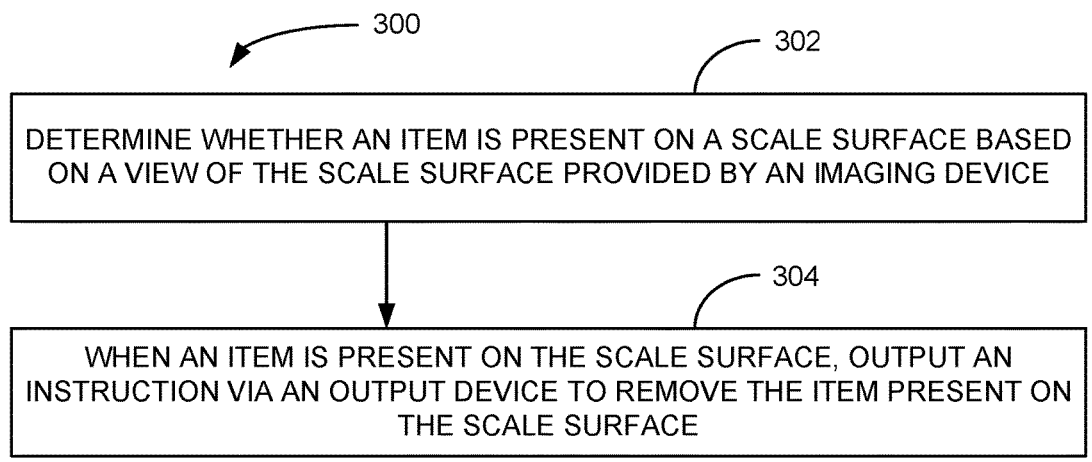
FIG. 3 is a block flow diagram of a method according to an example embodiment.

FIG. 3 is a block flow diagram of a method 300 according to an example embodiment. The method 300 is an example of a method that may be performed by a controller of a scanner/scale, such as the scanner/scale 102 of FIG. 1, by the computer 108 of FIG. 1, or a combination of both. The method 300 includes determining 302 whether an item is present on a scale surface based on a view of the scale surface provided by an imaging device. When an item is present on the scale surface, the method 300 further includes outputting 304 an instruction via an output device to remove the item present on the scale surface. In some embodiments, the method 300 also includes restarting the method 300 following the outputting 304 of the instruction to remove the item present on the scale surface. In a further embodiment of the method 300, when no item is present on the scale surface, the method 300 may provide an instruction via an output device for proceeding with a scale zeroing process.

The output device of some method 300 embodiments includes a display device. In some such embodiments, outputting 304 the instruction via the output device to remove the item present on the scale surface includes presenting, on the display device, an image captured by the imaging device. The presenting of the image captured by the imaging device, in some embodiments, first includes processing the image to be presented by subtracting a reference image captured by the imaging device from the image to be presented thereby leaving the item present on the scale surface and then presenting the processed image.

In a further embodiments of the method 300, when an item is present on the scale surface, the method 300 includes processing image data of the view to identify and read a barcode present therein to obtain a product identifier and performing a product lookup based on the product identifier to retrieve product information. In some such embodiments, outputting 304 the instruction via the output device to remove the item present on the scale surface includes an output based at least in part on the retrieved product data.

Figure 4:
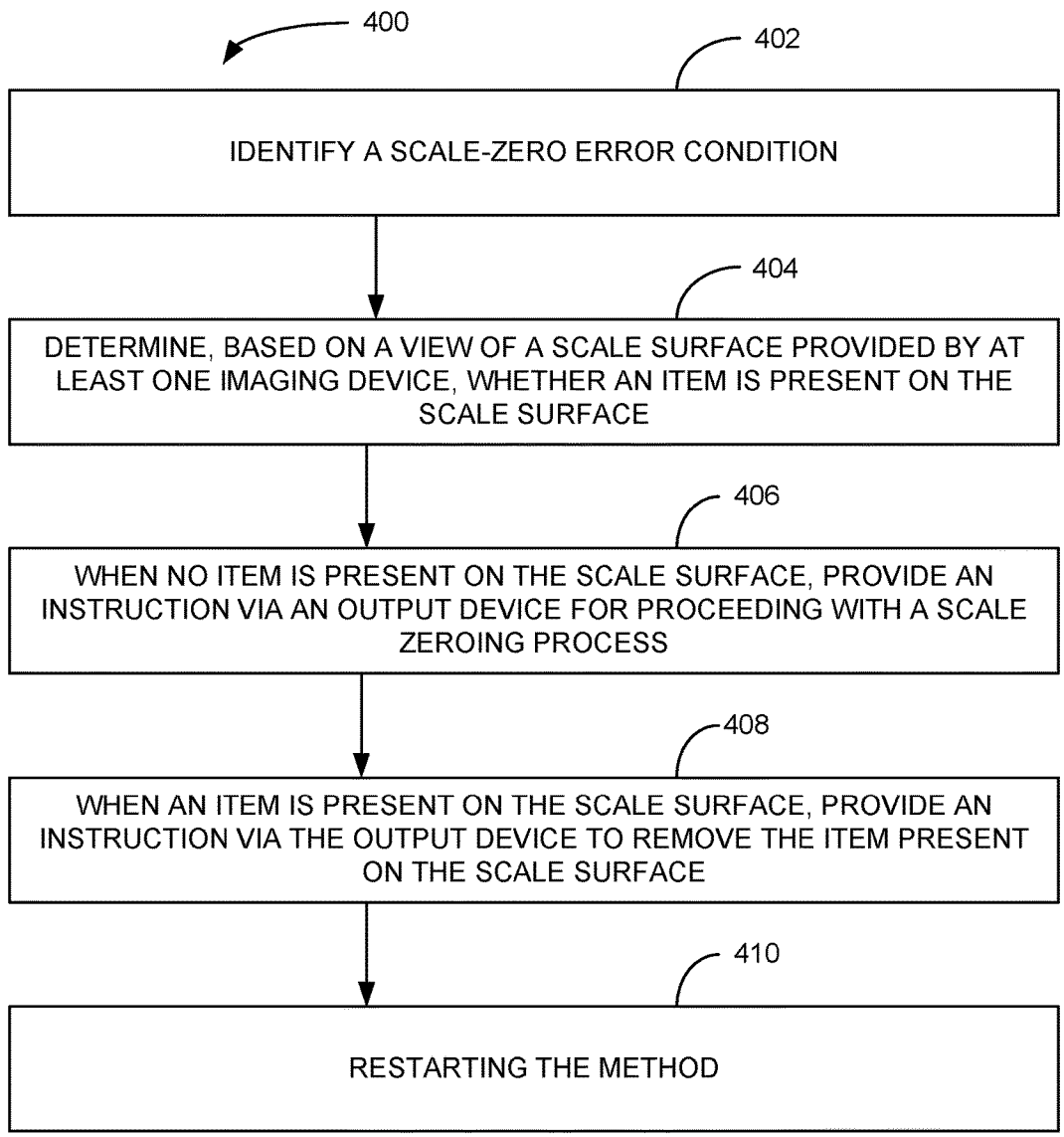
FIG. 4 is a block flow diagram of a method according to an example embodiment.

FIG. 4 is a block flow diagram of a method 400 according to an example embodiment. The method 400 is an example of another method that may be performed by a controller of a scanner/scale, such as the scanner/scale 102 of FIG. 1, by the computer 108 of FIG. 1, or a combination of both.

The method 400 includes identifying 402 a scale-zero error condition (e.g., a scale or POS terminal condition requiring a scale to be calibrated/zeroed) and determining 404, based on a view of a scale surface provided by at least one imaging device, whether an item is present on the scale surface. When no item is present on the scale surface, the method 400 includes providing 406 an instruction via an output device for proceeding with a scale zeroing process. When an item is present on the scale surface, the method 400 includes providing 408 an instruction via the output device to remove the item present on the scale surface and restarting 410 the method 400.

In some such embodiments, providing 408 the instruction via the output device to remove the item present on the scale surface includes presenting an image captured by the at least one imaging device. In one such embodiment, presenting the image captured by the at least one imaging device first includes processing the image to be presented by subtracting a reference image captured by the at least one imaging device from the image to be presented thereby leaving item present on the scale surface and then presenting the processed image.

In some embodiments of the method 400, providing 406 the instruction via the output device to remove the item present on the scale includes reading a barcode or other identifying data of an item present on the scale surface as included in the view provided by the at least one imaging device. The reading of the barcode is performed in some such embodiments to obtain a product identifier of the item. The output to remove the item present on the scale in such embodiments may include information with regard to the item retrieved based on the product identifier.

In some embodiments, the instruction provided 406 for proceeding with the scale zeroing process includes an instruction to press a zeroing button on the scale. The instruction to press the zeroing button may be provided at least in part with an image via a display device.

In some embodiments of the method 400, identifying 402 the scale-zero error condition includes comparing a weight of a scanned product with a stored known weight of the scanned product to verify scale accuracy and invoking a scale-zero error condition when the accuracy cannot be verified.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

What is claimed is:

1. A method comprising:
   identifying a scale-zero error condition of a scale communicatively coupled to a terminal;
   receiving an image from at least one imaging device of a view of a surface of the scale;
   determining, based on the view of a scale surface included in the image, whether, an item is present on the scale surface;
   when no item is present on the scale surface, providing an instruction via an output device for proceeding with a scale zeroing process; and
   when an item is present on the scale surface:
      providing an instruction via the output device to remove the item present on the scale surface, providing the instruction including:
         presenting an image of the item present on the scale that is to be removed, the image derived from the received image, the presented image derived by processing the received image subtracting a reference image captured by the at least one imaging device from the received thereby leaving the item present on the scale surface within the image; and restarting the method.

2. The method of Claim 1, wherein providing the instruction via the output device to remove the item present on the scale includes:
reading a barcode of an item present on the scale surface as included in the view provided by the at least one imaging device, the reading of the barcode performed to obtain a product identifier; and
the output to remove the item present on the scale includes information with regard to the item retrieved based on the product identifier.

3. The method of claim 1 wherein the instruction for proceeding the scale zeroing process including an instruction to press a zeroing button on the scale.

4. The method of claim 3, wherein the instruction to press the zeroing button is provided at least in part with an image via a display device.

5. The method of claim 1, wherein identifying the scale-zero error condition includes comparing a weight of a scanned product with a stored known weight of the scanned product to verify scale accuracy and invoking a scale-zero error condition when the accuracy cannot be verified.

6. The method of claim 1, wherein the output device includes an audio output device and a display device.

7. A device comprising:
an output device,
at least one processor; and
a memory device storing instructions executable by the at least one processor to perform data processing activities, the data processing activities comprising:
  identifying a scale-zero error condition of a scale communicatively coupled to device;
  receiving an image from at least one imaging device of a view of a surface of the scale;
  determining, based on the view of a scale surface included in the image, whether an item is present on the scale surface;
  when no item is present on the scale surface, providing an instruction via the output device for proceeding with a scale zeroing process; and
  when an item is present on the scale surface:
providing an instruction via the output device to remove the item present on tile scale surface, providing the instruction including presenting an image of the only item present on the scale that is removed, the image derived from the received image, the presented image derived by processing the received image by subtracting a reference image captured the at least one imaging device from the received thereby leaving the item present on the scale surface within the image; and
restarting the data processing activities.

* * * * *